United States Patent [19]

Ambridge et al.

[11] Patent Number: 4,664,585
[45] Date of Patent: May 12, 1987

[54] TOWING VEHICLE

[76] Inventors: Richard J. Ambridge; Mark R. Ambridge; Timothy L. Ambridge, all of "Willow Springs", Cranfield, Bedfordshire, MK43 0DG, England

[21] Appl. No.: 723,471

[22] Filed: Apr. 15, 1985

[30] Foreign Application Priority Data

Apr. 26, 1984 [GB] United Kingdom ................ 8410662
Dec. 19, 1984 [GB] United Kingdom ................ 8432076

[51] Int. Cl.⁴ ............................ B60D 3/12; B66F 7/08
[52] U.S. Cl. .................................... 414/563; 280/402; 280/755; 414/673; 414/719
[58] Field of Search ............... 280/402, 755, 756, 757, 280/758, 759, 760; 414/563, 673, 719; 212/196, 197, 198

[56] References Cited

U.S. PATENT DOCUMENTS

| | | | |
|---|---|---|---|
| 2,711,227 | 6/1955 | Shimmon | 280/759 X |
| 2,916,172 | 12/1959 | Locke | 280/759 X |
| 3,768,665 | 10/1973 | Eiler et al. | 212/197 |
| 4,299,530 | 11/1981 | Schaeff | 414/719 |
| 4,473,334 | 9/1984 | Brown | 414/563 |

FOREIGN PATENT DOCUMENTS

| | | | |
|---|---|---|---|
| 882374 | 7/1953 | Fed. Rep. of Germany | 280/755 |
| 188040 | 3/1964 | Sweden | 414/673 |
| 1548555 | 7/1979 | United Kingdom | 414/673 |

*Primary Examiner*—John J. Love
*Assistant Examiner*—Mitchell J. Hill
*Attorney, Agent, or Firm*—Watson, Cole, Grindle & Watson

[57] ABSTRACT

A towing vehicle which has a lifting beam at its rear end for lifting a vehicle prior to being towed is provided with tracks which extend longitudinally of the vehicle and at least one mass which can be moved along the tracks to vary the front axle loading of the vehicle, thus enabling the steering ability of the vehicle to be maintained even when lift/towing a heavy load.

5 Claims, 3 Drawing Figures

TOWING VEHICLE

BACKGROUND OF THE INVENTION

This invention relates to a towing vehicle, and more particularly to a towing vehicle suitable for recovering disabled vehicles.

It is conventional on recovery vehicles intended for recovery of heavy commercial vehicles to provide means for lifting the front of a vehicle being towed. Such lifting means may be in the form of a crane, or an arm pivotally mounted on the recovery vehicle chassis and movable relative to the recovery vehicle chassis by means of hydraulic rams to lift the vehicle being towed.

It is a consequence of applying an upward lifting force to a vehicle being towed that a torque is applied to the towing vehicle, tending to rotate the towing vehicle about the rear axle assembly thereof. The effect of this torque is to reduce the loading on the front axle of the towing vehicle when the lifting force is applied. Unless satisfactory precautions are taken, this could lead to front axle loading which is inadequate to provide safe steering of the towing vehicle. The front axle loading cannot satisfactorily be increased by means of counter-balance weights located at the front of the vehicle since if such weights were permanently located the front axle loading would become excessive when the towing vehicle was not applying a lifting force to a towed vehicle. The use of removable counter-balance weights would clearly be impracticable.

The accepted solution to the above problem is to make the wheel-base of the towing vehicle sufficiently long to maintain satisfactory front axle loading when the maximum permissible lifting force is being applied by the lifting tackle. However, this arrangement leads to the disadvantage that the vehicle is excessively long, thereby greatly reducing the maneuverability of the vehicle.

SUMMARY OF THE INVENTION

According to the present invention there is provided a towing vehicle having means at the rear thereof for applying a lifting force to a vehicle being towed and being provided with at least one mass mounted for movement longitudinally of the vehicle to vary the front axle loading of the vehicle.

Preferably the at least one mass is movable along a track or other suitable surface, advantageously under the action of a respective hydraulic ram.

In one preferred embodiment there are two masses, one movable along each side of the vehicle.

The or each mass may be movable from one end position substantially above the rear axle or axles to a second end position adjacent a driving cab of the vehicle.

In another preferred embodiment the at least one mass is pivotable in addition to its longitudinal ability to move, in which case it may be pivotable about a stop means located at the forward end of its longitudinal movement. To facilitate pivoting movement the mass may be movable longitudinally over a portion of its distance of movement adjacent its pivotable position along a track which is inclined downwardly.

By providing a substantial mass mounted on the towing vehicle and movable longitudinally thereof the front axle loading can be increased when the lifting tackle is in use by sliding the mass towards the front of the vehicle, and can be reduced when the lifting tackle is not in use by sliding the mass towards the rear of the vehicle. If, as is preferred, the mass when located in its rearmost position is directly above the rear axle assembly of the towing vehicle, it will have substantially no effect on the front axle loading of the vehicle when in this position. However, when the lifting tackle is in use the mass can be moved from its rearmost position forwardly until a satisfactory front axle loading is obtained.

The above and further features and advantages of the invention will become clear from the following description of a preferred embodiment thereof, given by way of example only, reference being had to the accompanying drawings, wherein:

DETAILED DESCRIPTION OF THE PREFERRED EMBODIMENT

Figure 1:
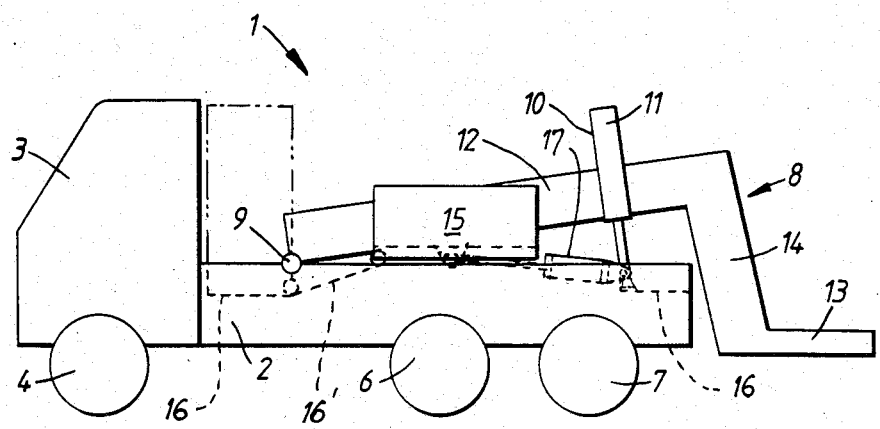
FIG. 1 is a side elevation schematically illustrating one embodiment of the invention.

The towing vehicle 1 shown in the drawings comprises a rigid chassis 2 carrying a cab 3 in conventional manner and defining a bed 29. The vehicle has a front axle 4 and a rear axle assembly 5 comprising tandem rear axles 6,7.

A lifting beam 8 is pivotally mounted by means of suitable bearings 9 on the chassis 2 and is pivotable about the bearings 9 by means of twin hydraulic rams 10. The cylinders 11 of the rams 10 are secured to the upper section 12 of the lifting beam 8, while the piston rods are coupled to suitable points on the chassis 2. The lifting beam 8 includes in addition to the upper section 12 a lower section 13 which in use is secured to a disabled vehicle, and an intermediate section 14 rigidly coupling the lower section 13 to the upper section 12.

In use, the rams 10 are retracted and the towing vehicle is reversed towards a disabled vehicle. The lower section 12 of the lifting beam 8 is coupled to the disabled vehicle, and the rams 10 are extended to lift the front of the disabled vehicle. The load imposed on the lifting beam 8 by the disabled vehicle tends to rotate the towing vehicle clockwise as viewed in FIG. 1, thereby reducing the front axle loading.

Figure 2:
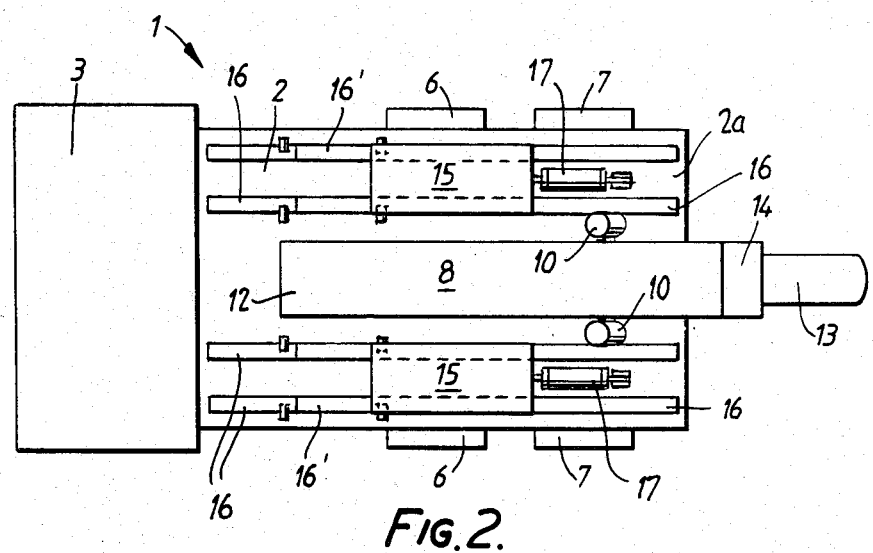
FIG. 2 is a plan view of the embodiment of the invention shown in FIG. 1.

In order to compensate for the reduced front axle loading a pair of masses 15 are slidably mounted on suitable tracks 16 mounted on the bed 29 of the chassis 2 and are movable longitudinally of the towing vehicle by suitable means, e.g., hydraulic rams 17. The tracks include inclined portions 16a. In the position illustrated in FIGS. 1 and 2 the masses 15 are located substantially above the rear axle assembly 5 and accordingly impose substantially no load on the front axle 4. However, when the lifting gear is in use the masses 15 may be moved forwardly towards the cab 3 in order to increase the loading on the front axle to a satisfactory level.

Figure 3:
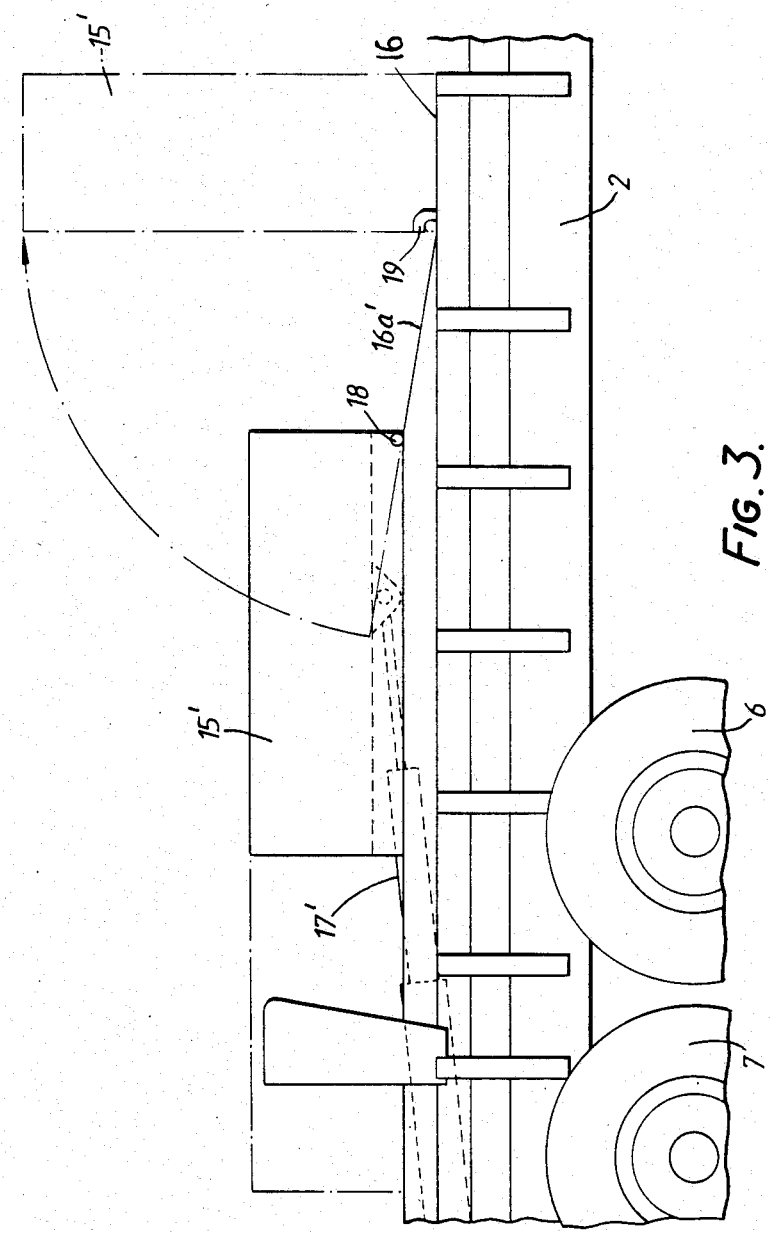
FIG. 3 is a side view of an embodiment incorporating a further improvement.

FIG. 3 shows a modification in which the masses 15' are moved not only longitudinally of the vehicle but are also tipped onto their end into a position immediately adjacent the cab. Clearly for stability during the longitudinal sliding process, the masses 15' are preferably shaped to be cuboids having a greater horizontal longitudinal dimension than their vertical dimensions. However this is not the most effective shape when it is desired to concentrate the weight as near as possible to the front of the vehicle, as the centre of gravity of the masses is located some distance from their front ends which are stopped by the cab.

In order to allow this advantageous tilting to take place, the tracks or other surface on which each mass slides are angled downwardly over the forward part of their distance, the incline being indicated by 16a'. Continued pushing by the hydraulic ram 17' causes a stop 18 on each mass to contact an abutment 19 of the vehicle.

Further pushing by the ram causes the mass 15, already tilted slightly by incline 16a' to pivot upwardly about the abutment 19 until it comes to rest in a vertical disposition when it can be secured by, e.g., locking lugs, or alternatively be held in position by the ram.

The masses may take any suitable form, for example they may consist of metal or concrete blocks, or boxes in which suitable material, e.g., shot may be loaded.

The lifting beam 8 is controlled by means of hydraulic power applied through the rams 10. Accordingly, the towing vehicle includes a hydraulic supply system, and this supply system may conveniently be used for moving the masses 15. It is to be understood, however, that other suitable means may be provided for moving the masses 15 if preferred.

Preferably, the vehicle includes measuring apparatus for measuring the downward load imposed by the towed vehicle on the towing vehicle. This will enable the optimum position of the masses 15 to be determined, e.g., by reference to a table, for any particular load.

A further advantage of the invention is that, when the masses 15 are in their rearmost position, they provide a substantially load directly over the rear, driving, wheels of the towing vehicle. This improves the ability of the vehicle to exert a straight pull, and thus improves to non-suspended towing capabilities of the vehicle. Thus, the preferred towing vehicle has ideal characteristics for both suspended and bar towing.

Another advantage is that the load on the back axle or axles is effectively reduced when the masses are moved forwardly, whereby a heavyweight may be lift-towed by the vehicle without overloading the back axle. By moving the masses, the back axle loading may be reduced by as much as 30 cwt to 2 tons.

The preferred masses are of between 1 and 3 tons in weight and may be between 6 and 7 feet in length and between 2 and 3 feet in height.

What we claim is:

1. In an elongated towing vehicle which includes a chassis that defines a front end, a rear end and a rear bed; a steerable front axle means mounted on said chassis; a load-bearing rear axle means mounted on said chassis; and a means connected to said chassis for applying a lifting force to a vehicle being towed behind the rear end of said chassis, the improvement wherein said towing vehicle includes at least one track means located on said rear bed, each track means extending longitudinally of said vehicle; a mass mounted for sliding movement on each track means; and a hydraulic ram means for moving each said mass on its associated track means, said hydraulic ram means functioning to move each mass towards said steerable front axle means so as to increase the loading thereon in response to an increased moment about said load-bearing rear axle means caused by the weight of a towed vehicle transmitted through said lifting means.

2. A towing vehicle according to claim 1, including two track means respectively located on opposite sides of the vehicle, and a hydraulic ram means connected to each mass on each said track means.

3. A towing vehicle according to claim 1, whereas said chassis includes a driving cab adjacent said front end, and wherein each said track means extends from a rearward end substantially above said rear axle means to a forward end adjacent said driving cab.

4. A towing vehicle according to claim 3, wherein each track means includes a rear portion which is horizontally oriented and a front portion which is downwardly inclined.

5. A towing vehicle according to claim 4, including a stop means located at the forward end of each track means and wherein each mass includes an abutment which is pivotable around an associated stop means.

* * * * *